/ Patented Mar. 27, 1945

2,372,624

UNITED STATES PATENT OFFICE 2,372,624

METHOD OF PREPARING ALIPHATIC OXYAMINES

Erwin L. Carpenter, Old Greenwich, Conn., assignor to American Cyanamid Company, New York, N. Y., a corporation of Maine No Drawing. Application October 4, 1941, Serial No. 413,643

5 Claims. (Cl. 260—584)

The present invention relates to a method of preparing an aliphatic oxyamine of the formula

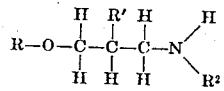

wherein R is an aliphatic hydrocarbon radical, R' is a member of the class consisting of hydrogen and an aliphatic hydrocarbon radical, and $R^2$ is a member of the class consisting of hydrogen and the radical

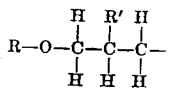

from a solution of an aliphatic oxynitrile containing an alkaline material, which includes the steps of first neutralizing said alkaline material and then hydrogenating the oxynitrile in the presence of a hydrogenation catalyst, and without removing the product of the neutralization reaction.

It has been found that the above class of amines may be obtained in an advantageous manner and with high yields as follows:

(1) Formation of the corresponding aliphatic oxynitrile by causing an α,β-unsaturated nitrile having the formula

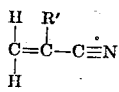

in which R' is either hydrogen or an aliphatic hydrocarbon radical, to react with an aliphatic alcohol in the presence of a soluble alkaline catalyst;

(2) Neutralization of the alkaline catalyst in the reaction product by addition of the requisite amount of a concentrated mineral acid, and, (3) Hydrogenation of the oxynitrile without removing the product of the neutralization reaction, preferably under elevated pressure in the presence of a hydrogenation catalyst.

In the formation of the aliphatic oxynitrile an ether linkage occurs in the molecule resulting from the addition of the alcohol to the nitrile. For example, methyl alcohol may be readily added to acrylonitrile to form 3-methoxypropionitrile according to the equation:

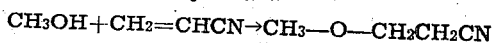

The aliphatic alcohols which may be used in forming the aliphatic oxynitriles includes the monohydric primary, secondary, tertiary and unsaturated alcohols.

Soluble alkaline catalysts which may be utilized in promoting the reaction between the α,β-unsaturated nitrile and the aliphatic alcohol include the metal alcoholates (e. g. NaOCH₃, KOCH₃, NaOC₂H₅, KOC₂H₅ and the like), the oxides and hydroxides of those metals which are soluble in aliphatic alcohols (e. g. NaOH, KOH, Na₂O, K₂O). The alcoholates may be introduced into the reaction mixture per se, or they may be formed in the reaction mixture in situ, for instance by adding a metal such as sodium or potassium, a metal amide (NaNH₂), a metal urea

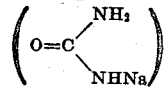

and the like. The amount of said catalyst utilized is exceedingly small, and usually in the proportion of from .005 to 1% of the total weight of the nitrile and alcohol.

While the reaction between the α,β-unsaturated nitrile and the aliphatic alcohol takes place in most mixtures at a temperature within the range of 30° to 150° C., it may be found practical to operate at somewhat lower or higher temperatures. In a reaction where it is preferable to employ temperatures lying above the boiling point of at least one of the components, it may be advantageous to carry out the reaction in a closed vessel under pressure.

The catalytic hydrogenation of the said aliphatic oxynitriles may be carried out at widely different temperatures, pressures of hydrogen, and with a number of hydrogenation catalysts. Generally it is preferred to work within a temperature range of 70–175° C., and at increased pressures of from 20 to 250 atmospheres. Materials useful as catalysts in promoting the hydrogenation of the aliphatic oxynitriles include metals such as nickel, copper and cobalt, and difficultly reducible metal oxides such as platinum oxide and chromium oxide. Usually it is preferable to employ the catalyst in a finely divided form, and hence Raney nickel is found to be very efficient. In some cases it may be advantageous to use the catalyst in the form of grains or pieces, or it may be deposited on or dispersed in carriers such as zeolites, silica gel, pumice stone, bleaching earths, and the like.

By a proper selection of the hydrogenation conditions, that is, temperature, pressure of hydrogen, type and quantity of catalyst used, either mainly primary or mainly secondary amine is formed. High yields of primary amines are more readily obtained in a rapid reaction employing high hydrogen pressure, a relatively large amount of catalyst and as low a temperature as possible.

High yields of primary amine are also obtained by the addition of ammonia to the nitrile, since the presence of this compound effectively cuts down the formation of secondary amines. On the other hand, a slow reaction employing low hydrogen pressure with or without the use of an inert diluent gas such as nitrogen, a relatively small amount of catalyst and a high temperature (150–250° C.) favors the formation of secondary amines. A large amount of secondary amine may also be formed, if desired, by sorption of hydrogen at rather low temperatures (70–150° C.), followed by heating the mixture to considerably higher temperatures (200–300° C.) for several hours in contact with hydrogen and the hydrogenation catalyst.

During the hydrogenation it is advantageous to mix the reacting materials thoroughly, for example, by stirring or shaking of the vessel.

These aliphatic oxyamines have a number of widely diversified uses. When combined with fatty acids they readily form soaps which are valuable emulsifying agents suitable for a number of purposes, for example, in the preparation of polishes, paints, lacquers, printing compositions, waxes, leather dressings, paper coating, finishing compositions, water-proofing compositions, shoe creams and polishes, and in general, all types of film-forming emulsions. The free amines may also serve as emulsifying agents in a number of cases.

The presence of an ether and an amine group in the same molecule tends to increase both the oil and water solubility of the products. The lower members of the series are completely miscible with water as well as with all of the common organic solvents. They are good solvents for resins, dyes, waxes, casein and shellac. The longer members of the series, and in particular [C$_{18}$H$_{37}$O(CH$_2$)$_3$]$_2$NH, are excellent cation-active softening agents for use in the textile field.

The products of this invention may also be useful as wetting agents, detergents, demulsifiers and lubricants. They may be employed in breaking petroleum emulsions, as a gum solvent for gasoline, in the color stabilization of gasoline and lubricating oils, in purification processes such as the removal and/or recovery of acid gases, for example, hydrogen sulfide, sulfur dioxide and carbon dioxide, in the neutralization of the acidity of oils, in the preparation of accelerators, inhibitors, anti-oxidants, anti-freeze solutions and anti-knock agents, as corrosion inhibitors, insecticides, fly spray ingredients, pharmaceuticals, fire proofing agents, tanning agents, foaming agents, and textile assistants, in improving dye compositions, in the preparation of pigments and lakes, as flotation reagents, plasticizers for paints and nitrocellulose lacquers, as alkaline materials for permanent wave solutions, in formulating dry-cleaning soaps, cosmetic creams, and in general cleansing compositions containing soaps.

These amines also serve as intermediates in the preparation of numerous derivatives such as, for example, various salts by reaction with inorganic acids, N-substituted amides and imides, alkylated, arylated, hetero-substituted amines and their salts, N-halogen derivatives, alkyl dithiocarbamic acids, thionyl amines, nitroso amines, hydroxyamines, hydroxamic acids, substituted cyanamides, guanidines, melamines, ureas, Grignard reagents, substituted alkylol amines, azides, sulfamic acids, sulfonamides, etc.

This invention will be illustrated in greater detail by the preparation of the compounds shown in the following examples. Parts indicated are by weight.

*Example 1*

0.5 part of sodium metal is dissolved in 138 parts of methyl alcohol. 212 parts of acrylonitrile are added slowly with stirring, the temperature being maintained at 30–35° C. by cooling. The solution is stirred for three hours, then neutralized with the requisite amount of concentrated sulfuric acid. 12 parts of Raney nickel catalyst are added. The mixture is treated at 110° C. in an autoclave with hydrogen under a pressure of 40–70 atmospheres as long as hydrogen is absorbed. The nickel catalyst is filtered from the reaction products and the latter fractionally distilled in vacuo. 218.2 parts of 3-methoxypropylamine (boiling point of 76–78° C. at 190 mm.) and 60.6 parts of bis(3-methoxypropyl)amine (boiling point of 90–92° C. at 10 mm.) are obtained.

*Example 2*

159 parts of acrylonitrile are added slowly with stirring to 195 parts of n-propyl alcohol in which is dissolved 0.3 part of metallic sodium, the temperature being held between 35 and 40° C. throughout the addition. The resulting solution is stirred for five hours at room temperature, neutralized with concentrated sulfuric acid and hydrogenated in contact with 10 parts of Raney nickel under a pressure of 60–100 atmospheres at 110–120° C. The amines produced are filtered free of the nickel catalyst and fractionally distilled to yield 228.2 parts of 3-n-propoxypropylamine (boiling point of 84–89° C. at 80 mm.) and 75.6 parts of bis(3-n-propoxypropyl)amine (boiling point of 94–98° C. at 0.5–1 mm. pressure).

*Example 3*

One part of sodium metal is dissolved in 188.7 parts of n-butyl alcohol. 132.5 parts of acrylonitrile are added slowly with stirring while the temperature is held at 40° C. The solution is stirred for six hours at room temperature and then neutralized with sulfuric acid. 15 parts of Raney nickel are added. The mixture is hydrogenated in an autoclave under a pressure of 70–115 atmospheres at 115–125° C. The nickel catalyst is removed and the product distilled in vacuo. 175 parts of 3-n-butoxypropylamine (boiling point 80–84° C. at 30 mm.) and 69.6 parts of bis(3-n-butoxypropyl) amine (boiling point 115° C. at 0.5 mm.) are obtained.

*Example 4*

106 parts of acrylonitrile are added slowly to 270.1 parts of 2-ethylhexyl alcohol in which is dissolved 0.3 part of sodium metal, the temperature being maintained at 40–45° C. during the addition. The solution is stirred for five hours, neutralized with concentrated sulfuric acid and hydrogenated in contact with 10 parts of Raney nickel under a pressure of 20–47 atmospheres at 115° C. The reaction product is filtered free of the nickel and fractionally distilled to yield 242.1 parts of 3-(2-ethylhexoxy)-propyl amine (boiling point 74–77° C. at 0.5 mm.) and 58.5 parts of bis [3-(2-ethylhexoxy)-propyl] amine (boiling point 151–160° C. at 0.5 mm.).

*Example 5*

A mixture consisting of 5 parts of Raney nickel and 87.7 parts of crude 2-methyl-3-methoxypropionitrile (containing sodium sulfate resulting from the neutralization of the sodium catalyst with sulfuric acid) is treated at 110° C. in an autoclave with hydrogen under a pressure of 20-55 atmospheres as long as hydrogen is absorbed. The mixture of primary and secondary amines thus produced is separated from the nickel catalyst and distilled in vacuo to yield 50.2 parts of 2-methyl-3-methoxypropylamine (boiling point of 86-88° C. at 190 mm.) and 15.2 parts of bis(2-methyl-3-methoxypropyl)amine (boiling point of 72-73° C. at 2 mm. pressure).

*Example 6*

A solution of 0.5 part of metallic sodium dissolved in 10 parts of ethyl alcohol is added to 270 parts of n-octadecyl alcohol heated to 60° C. To this solution 60 parts of acrylonitrile are added slowly with stirring, the temperature being held at approximately 60° C. by adequate cooling. After the addition of the nitrile, the solution is kept at 60-65° C. for 16 hours. It it then neutralized with concentrated sulfuric acid and treated at 105-110° C. in an autoclave with hydrogen under a pressure of 130 atmospheres in contact with 10 parts of Raney nickel catalyst. After the hydrogenation is completed, the solution is cooled to 70-80° C., filtered from the nickel catalyst and evacuated to remove any ammonia formed during the reaction. The resulting product is a white waxy crystalline solid at room temperature consisting of approximately 75% 3-n-octadecoxypropylamine and 25% bis(3-n-octadecoxypropyl)amine.

*Example 7*

In another hydrogenation, 280 parts of crude 3-n-octadecoxyproprionitrile (containing sodium sulfate resulting from neutralization of the sodium catalyst with sulfuric acid) are subjected to a hydrogen pressure of 65 atmospheres in contact with 5 parts of Raney nickel catalyst at 125° C. After the sorption of hydrogen is finished, the temperature of the solution is raised to 250° C. where it is maintained for 4 hours. The autoclave is then cooled to 70-80° C., the hydrogen vented and the solution filtered hot to remove the nickel catalyst. 239 parts of a colorless solution are obtained which becomes a hard, crystalline solid when cooled to room temperature. This product consists of approximately 13% 3-n-octadecoxypropylamine and 87% bis(3-n-octadecoxypropyl)amine.

As noted above, many of the amines of the present invention, and particularly the higher amines, are excellent textile finishing agents when used in the form of their salts. Thus, for example, it has been found that bis(3-n-octadecoxypropyl)-amine acetate is an excellent cationic or so-called permanent finish for textile materials such as yarns, threads, cotton, silk, rayon and the like. Preferably the yarn or fabric is dipped into or sprayed with a water solution or water dispersion of the amine salt of a sufficiently high concentration to leave thereon, after drying, approximately 1% or less of the finish.

In addition to their use as the sole finishing agents for textiles, the higher amines of the present invention may also be applied in the form of emulsions with fats, oils, waxes, urea-formaldehyde resins, alkyd resins, paraffin, or mixtures containing the same. Many of the higher aliphatic oxyamines are excellent emulsifying agents for fats, oils, waxes and resins, so that it is only necessary to subject these substances in admixture with an aqueous solution of the amine to homogenization or high speed agitation, as in a colloid mill, in order to prepare excellent semipermanent finishes that are well retained by the yarns and fabrics even after several washings.

Additional representative compounds that have shown excellent properties when used as textile finishes are bis(3-n-dodecoxypropyl)amine acetate and 3-n-octadecoxypropylamine acetate. In general, the mixture of primary and secondary amines formed in the hydrogenation may be used without any separation into the component parts.

These and similar aliphatic oxyamines may be used either in the form of their salts with inorganic acids such as the sulfate, hydrochloride, etc., or as salts of organic acids such as acetic, oxalic, tartaric, α-hydroxyisobutyric acids and the like.

While the invention has been described with particular reference to specific embodiments, it is to be understood that it is not to be limited thereto but is to be construed broadly and restricted solely by the scope of the appended claims.

This application is a continuation-in-part of applicant's application Serial No. 343,548.

I claim:

1. A method of preparing an aliphatic oxyamine of the formula

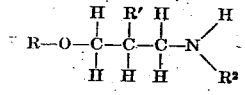

wherein R is an aliphatic hydrocarbon radical, R' is a member of the class consisting of hydrogen and an aliphatic hydrocarbon radical, and R² is a member of the class consisting of hydrogen and the radical

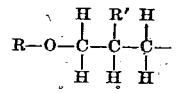

from a solution of an aliphatic nitrile of the formula

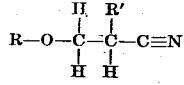

containing an alkaline material selected from the group consisting of sodium alcoholates, potassium alcoholates, sodium hydroxide, potassium hydroxide, sodium oxide and potassium oxide, which includes the steps of first neutralizing said alkaline material and then hydrogenating the oxynitrile in the presence of a hydrogenation catalyst, and without removing the product of the neutralization reaction.

2. A method of preparing an aliphatic oxyamine of the formula

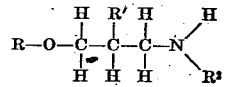

wherein R is an aliphatic hydrocarbon radical, R' is a member of the class consisting of hydrogen and an aliphatic hydrocarbon radical, and R² is a member of the class consisting of hydrogen and the radical

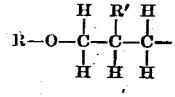

from a solution of an aliphatic nitrile of the formula

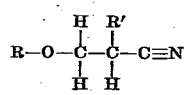

containing an alkaline material selected from the group consisting of sodium alcoholates, potassium alcoholates, sodium hydroxide, potassium hydroxide, sodium oxide and potassium oxide, which includes the steps of first neutralizing said alkaline material with sulfuric acid and then hydrogenating the oxynitrile in the presence of a hydrogenation catalyst, and without removing the product of the neutralization reaction.

3. The method of claim 1 in which the catalyst is Raney nickel.

4. The method of claim 1 in which the hydrogenation is carried out at from 70° C. to 300° C. under pressure.

5. The method of claim 1 in which the hydrogenation is carried out at from 70° C. to 300° C. under from 20 to 250 atmospheres and in the presence of Raney nickel as a catalyst.

ERWIN L. CARPENTER.